United States Patent Office 3,361,809
Patented Jan. 2, 1968

3,361,809
PROCESS FOR PREPARING FUMARIC ACID
Alfred Saffer, North New Hyde Park, and Harry Olenberg, Bronx, N.Y., assignors to Halcon International, Inc., a corporation of Delaware
No Drawing. Filed Mar. 18, 1965, Ser. No. 440,915
4 Claims. (Cl. 260—533)

This application is a continuation-in-part to copending U.S. patent application Ser. No. 36,725, filed June 17, 1960, now abandoned.

This invention relates to a method for preparing fumaric acid. Specifically, this invention relates to the preparation of fumaric acid from maleic acid which has been produced by the air oxidation of benzene.

The preparation of fumaric acid via a combination of reactions starting with benzene as the raw material is well known. The benzene is oxidized with air or other oxygen-containing gas over a catalyst such as vanadia or molybdena or a combination thereof. The partial oxidation results in the preparation of maleic anhydride which is absorbed in water to form maleic acid. The maleic acid is then conventionally isomerized, generally in the presence of a catalyst to fumaric acid.

In the present commercial process the maleic acid which is formed contains impurities which interfere with the subsequent isomerization to fumaric acid. The impurities are particularly detrimental when a bromine-persulfate isomerization catalyst is employed.

In accordance with this invention, it has been found that the impurities formed in the benzene oxidation, at least those impurities which interfere with the subsequent isomerization, may be minimized by carrying out the oxidation at extremely high conversions, namely, at least 97%, preferably 98%, and most desirably, above 98.5%. Conversion is calculated by dividing mols of benzene reacted by mols of benzene fed to the reaction. The mols of benzene fed and reacted are based on by-product analysis of the reactants.

By performing these reactions at extremely high conversions, apparently the particular impurities which interfere with the bromine-persulfate catalysed isomerization are consumed. This result is completely unexpected since high coversion oxidation is advantageous to the isomerization reaction only when the aforesaid catalyst is employed.

As a preferred embodiment of the invention, it is advantageous to contact the aqueous maleic acid solution with an adsorbent such as activated carbon, alumina, silica gel, diatomaceous earth or an ion exchange resin to further improve the color properties and minimize impurities.

The oxidation of benzene by means of air or oxygen-containing gases as in the presence of molybdena or vanadia catalysts are well known. In prior processes, the oxidation of the benzene, i.e., the conversion, was limited to about 94% to 97% because higher conversions resulted in economically significant decrease in selectivity, i.e., the formation of increased amounts of carbon dioxide and water to the detriment of the overall maleic anhydride production. As would be expected, the benzene oxidation was performed so as to maximize the amount of maleic anhydride produced based on the benzene feed.

Applicants have found that by "over oxidizing" the benzene, i.e., operating at a conversion beyond the optimum yield of maleic anhydride, the total fumaric acid produced by the process can be increased. As stated previously, this resulted from an extremely high conversion and selectivity in the isomerization step.

The technique for performing high conversion benzene oxidation is known to those skilled in the art. Higher than optimum conversions may be performed by many techniques such as by increasing the temperature, decreasing space velocity or by using a more active catalyst. These high conversions, in excess of 97%, can be achieved by using a feed from 1.2 to 1.5 mol percent benzene at a reaction temperature of 350 to 450° C. and a volume space velocity of 2000 to 3000/hours, preferably about 250/hours.

The reactor effluent is absorbed in water so as to form maleic acid. Sufficient water is used to form a maleic solution containing from 15 to 90% of maleic acid, preferably from 30 to 50%.

The solution may thereafter be contacted with a solid adsorbent to selectively remove other impurities and color bodies. Generally, 1 to 300 parts of liquor are treated per part of the adsorbent, preferably from 100 to 250 parts. The adsorption temperature is of little importance and preferably the adsorption is performed at room temperature. Of course, the temperature should be such to prevent the precipitation of the maleic acid from the solution or, at the other extreme, the rapid evaporation of the liquor.

The bromine-persulfate isomerization catalyst used in the instant invention is unique in that it is sensitive to certain impurities which apparently may be eliminated by performing the oxidation at high conversions, conversions so high as to exceed the optimum yield of maleic anhydride. These catalysts are composed of two components, namely, a "bromine-providing compound" and an "oxidizing agent."

By "bromine-providing compound" is meant any soluble compound which, when in contact with the oxidizing agent, forms a mono or dioxy bromo complex. Examples of the broad classes of these compounds are: inorganic bromides wherein the bromine has a valence of −1; bromine; n-bromoamides, n-bromoimides, acyl bromides and inorganic hypobromites wherein the bromine has a valence of +1.

The specific examples of the soluble bromides include the alkali metal bromides such as lithium bromide, sodium bromide, potassium bromide, rubidium bromide, and cesium bromide; alkaline earth bromides such as beryllium bromide, magnesium bromide, calcium bromide, strontium bromide, cadmium bromide and barium bromide; Group V bromides including those of vanadium and bismuth; Group VII bromides such as manganese bromide; and Group VIII bromides such as iron, nickel and copper bromide. Additionally, hydrobromic acid and ammonium bromides as well as polybromides such as cadmium ammonium bromides.

N-bromoamides having the formula $RCONHBr$, N-bromoimides having the formula $R(CO)_2NBr$, and organic acyl bromides having the formula $RCOBr$ are effective, wherein the R is a hydrocarbon radical such as an alkyl, aryl, alkenyl, or aralkyl group having from one to 30 carbon atoms. Examples of the acyl bromides are acetyl bromide, propionyl bromide, n-butyryl bromide, isobutytyl bromide, n-valeryl bromide, isovaleryl bromide, n-caproyl bromide, capryl bromide, stearoyl bromide, and benzoyl bromide. Illustrative of the N-bromoamides are N-bromo-acetamide, N-bromo-propionamide, N-bromo-n-butramide, N-bromo-n-valeramide, N-bromo-n-caproamide, N-bromo-benzamide. Closely, analogous to the aforesaid amides are the N-bromoimides such as N-bromosuccinimide and N-bromophthaloimide. The above organic bromine compounds are effective because they readily hydrolyze when introduced into the maleic acid solution. The hydrolysis results in the formation of HBr which, as pointed out above, is an effective bromine providing compound.

The soluble inorganic hypobromites includes the alkali metal and alkaline earth metal type such as sodium, potassium and calcium hypobromite. Nitrosyl bromide is still another example.

The "oxidizing agent" which may be employed include the soluble inorganic persulfates, hydrogen peroxide, and the soluble organic peroxides and hydroperoxides. The persulfates are preferably the ammonium or alkali or alkaline earth metal salts. Specifically, ammonium persulfate, sodium persulfate, potassium persulfate, lithium persulfate, calcium persulfate, manganese persulfate are the most important examples. The organic peroxides include cyclohexanone peroxide, acetyl peroxide, lauroyl peroxide, and t-butyl peroxide. The hydroperoxides include cumene hydroperoxide, t-butyl hydroperoxide, tetralin hydroperoxide, methyl ethyl ketone hydroperoxide and methylcyclohexane peroxide.

As a guide to the relative strength of oxidizing agents, reference is made to "Handbook of Chemistry," by N. A. Lange, 9th ed., Handbook Publishers, Inc., Sandusky, Ohio (1956), pages 1212 to 1218, especially pages 1217 and 1218, showing a strength (volts) of 2.05 for the persulfate and 1.77 for hydrogen peroxide. For the chlorate, a strength of 1.23 is shown.

The reaction temperature is in the range of 70° C. to the boiling point of the solution under atmospheric pressure or higher temperatures if elevated pressure is used. Generally, the practical upper limit is 110° C., and a preferred range of a one minute to one-half hour, even at the lower temperatures.

Based on the weight of maleic acid, the bromine content of the material may be present in an amount (calculated as ammonium bromide) in the range of 0.001 to 10.0%, desirably 0.01 to 5.0 and preferably 0.1 to 3.0. At the lower concentrations of bromine relatively higher temperatures are indicated. Higher amounts of bromine containing material may be used but are not preferred for both economic reasons and to avoid discoloration of the final product.

Based on the weight of maleic acid, the amount of oxidizing agent may be in the range of 0.003 to 10.0% (i.e., on a molar basis of oxidant calculated as ammonium persulfate), desirably 0.1 to 5.0 and preferably 0.5 to 2.5%.

The standard used to indicate the quantity or intensity of color of the products in solution form is known as the A.P.H.A. standard color test. This test is one developed by the American Public Health Association which is known as the Hazen Platinum Cobalt Scale, a description of which is found on page 2048 of the 5th edition of "Standard Methods of Chemical Analysis," by Wilford W. Scott.

In order to indicate more fully the invention, attention is drawn to the following examples:

*Example 1*

A catalyst such as described in detail in U.S. Patent 2,777,860 and composed basically of 2.5 parts of molybdena and 5.2 parts of vanadia supported on 50 parts of a ceramically bonded fused alumina of 4.8 mesh size (U.S. Sieve) is charged into a vertical reactor tube of ⅞ inch internal diameter, to a bed height of 10 feet. The inner surface of the reactor tube is carbon steel and surrounded with molten salt as a temperature regulating medium.

A benzene-air mixture is fed downward through this reactor at a volume space velocity of 2500 per hour (volume of feed gas per volume of catalyst per hour). The feed mixture contains 1.21 mol percent of benzene in air, and the reaction temperature is maintained at 360° to 375° C. The reaction product is absorbed in water or aqueous liquor.

The above reaction procedure gives a 91 to 97% conversion of benzene per pass, a selectivity of 69 to 72 mol percent of maleic anhydride, and an overall yield of 86.8% of maleic anhydride in the reaction product.

After adsorption in the water the combined aqueous liquor is slowly passed through a 26" x 5/16" I.D. decolorizing column packed with activated carbon. The effluent from the column has A.P.H.A. color of greater than 70. The maleic acid content is 41.7%. 150 grams of this decolorized liquor is isomerized at 100° C. in an agitated flask in the presence of 0.75 weight percent ammonium bromide and 1.35 weight percent ammonium sulfate based on the acid as catalyst. After 7½ minutes the reaction mass is cooled to 24° C. 38.1 grams of tanfumaric acid is recovered. This is equal to 60.9% theoretical conversion of maleic acid to fumaric acid.

*Example 2*

Using the system described in Example 1, the conversion is increased to 98.5% by increasing the temperature. In this example the temperature varies during the reaction from 364° to 379° C. A selectivity of 68% is attained. This gives an overall yield of only 86.3%. This 0.5% drop in overall yield is economically important in typical large scale commercial operation and would normally be avoided. After adsorption in water the aqueous maleic acid solution is decolorized as described in Example 1 and the column effluent has an A.P.H.A. color less than 60. The maleic acid content of the liquor is 43.8%. 175.8 grams of this liquor is isomerized as described in Example 1. 76.8 grams of white fumaric acid is recovered. This is equal to a 86.6% conversion of maleic to fumaric acid, an increase of 37.7% as compared to Example 1.

*Example 3*

The procedure of Example 2 is repeated except that the decolorizing column contains:

First 12 inches—activated carbon
Second 2 inches—cation exchange resin (acid form)
Third 12 inches—activated carbon and the A.P.H.A. color of the effluent is 40. Similar results are obtained.

*Example 4*

The procedure of Example 2 is repeated except that the decolorization column contains alumina, and similar results are obtained.

*Example 5*

The procedure of Example 2 is repeated except that the decolorization column contains silica gel, and similar results are obtained.

*Example 6*

The procedure of Example 2 is repeated except that the liquor is slurried with diatomaceous earth, and then filtered to give a treated filtrate or effluent, and similar results are obtained.

*Example 7*

Decolorized liquors from Examples 1 and 2 are isomerized at 85° to 90° C. for 1.5 hours using 0.75 weight percent thiourea on a total solution basis. In both cases conversions to fumaric acid equal 81% of white fumaric acid.

It will be understood that modifications and variations may be affected without departing from the spirit of the invention.

What is claimed is:

1. A process for converting benzene to pure white fumaric acid which comprises catalytically oxidizing benzene with oxygen to maleic anhydride at a conversion of benzene per pass of at least 97%, absorbing the anhydride in water to form aqueous maleic acid solution, contacting the solution with a solid adsorbent and separating an effluent, isomerizing the maleic acid in said effluent to fumaric acid by contact with a soluble isomerization catalyst selected from the group consisting of inorganic bromides; alkali and alkaline metals hypobromites; nitrosyl bromide; bromine; N-bromoamides having the formula RCONHBr, N-bromoimides having the formula R(CO)$_2$NBr, and organic acyl bromides wherein the hydrocarbon radical has from 1 to 30 carbon atoms; and an oxidizing agent selected from the group consisting of ammonium, alkali and alkaline earth metal persulfates; hydrogen peroxide; benzoyl peroxide, cyclohexanone peroxide, acetyl peroxide, methyl-cyclohexane peroxide, lauroyl peroxide and t-butyl peroxide; cumene hydroperoxide, t-butyl hydroperoxide, tetrahydronaphthalene hydroperoxide, methyl ethyl ketone hydroperoxide and at a temperature between 70 and 110° C., and separating the formed solid fumaric acid as a pure white product.

2. A process of claim 1 wherein the adsorbent is in a series of zones, the first zone containing active carbon, the second zone containing cation exchange resin in the acid form and the third zone containing active carbon, and the effluent color is not over 1 on the Gardner scale.

3. A process of claim 1 wherein the benzene conversion is at least 98.5.

4. A process for converting benzene to pure white fumaric acid which comprises: oxidizing said benzene with molecular oxygen in the presence of a vanadia catalyst at a reaction temperature of from 350 to 450° C., at a space velocity of 2000 to 3000/hours so as to convert at least 97% of said benzene per pass; absorbing the result maleic anhydride in water to form an aqueous maleic acid solution; contacting said solution with an adsorbent in a series of zones, the first zone containing active carbon, the second containing a cation exchange resin in an acid form and the third zone containing active carbon; isomerizing the maleic acid in the resulting effluent to fumaric acid at a temperature in the range of 70 to 110° C., in the presence of an isomerization catalyst selected from the group consisting of soluble inorganic bromides; alkali and alkaline metals hypobromites; nitrosyl bromide; bromine; N-bromoamides; N-bromoimides; and aryl bromides wherein the hydrocarbon radical has from 1 to 30 carbon atoms; and an oxidizing agent selected from the group consisting of ammonium, alkali and alkaline earth metal persulfates; hydrogen peroxide; benzoyl peroxide, cyclohexanone peroxide, acetyl peroxide, lauroyl peroxide and t-butyl peroxide; cumene hydroperoxide, t-butyl hydroperoxide, tetralin hydroperoxide, methyl ethyl ketone hydroperoxide and methylcyclohexane peroxide, and separating the formed solid fumaric acid as a pure white product.

References Cited

UNITED STATES PATENTS

| | | | |
|---|---|---|---|
| 2,790,827 | 4/1957 | Cummings et al. | 260—537 |
| 2,979,445 | 4/1961 | Lavigne et al. | 260—537 |
| 3,086,026 | 4/1963 | Wiebusch | 260—533 |
| 3,109,025 | 10/1963 | Olenberg | 260—537 |
| 3,141,037 | 7/1964 | Olenberg | 260—533 |
| 3,262,972 | 7/1966 | Barker | 260—537 |

FOREIGN PATENTS

| | | |
|---|---|---|
| 250,667 | 4/1964 | Australia. |
| 825,685 | 10/1952 | Germany. |

OTHER REFERENCES

Kharasch et al.: Journal of the American Chemical Society, vol. 59, p. 1155 (1937).

LORRAINE A. WEINBERGER, *Primary Examiner.*

R. K. JACKSON, *Examiner.*

I. R. PELLMAN, S. B. WILLIAMS, *Assistant Examiners.*